US012671026B2

(12) United States Patent
Xu et al.

(10) Patent No.: US 12,671,026 B2
(45) Date of Patent: Jun. 30, 2026

(54) CASTING DRY-TYPE TRANSFORMER AND MANUFACTURING METHOD THEREOF

(71) Applicant: Haihong Electric Co. Ltd., Jiangmen (CN)

(72) Inventors: Kaixuan Xu, Jiangmen (CN); Qingning Liang, Jiangmen (CN); Danju Song, Jiangmen (CN); Dengling Zhou, Jiangmen (CN); Yixiong Liang, Jiangmen (CN); Yuxiang Qi, Jiangmen (CN); Fei Li, Jiangmen (CN); Wenjie Fang, Jiangmen (CN); Yazhong Liang, Jiangmen (CN); Jingyu Tan, Jiangmen (CN); Wanhuan Li, Jiangmen (CN); Chuyong Li, Jiangmen (CN)

(73) Assignee: Haihong Electric Co. Ltd., Jiangmen (CN)

( * ) Notice: Subject to any disclaimer, the term of this patent is extended or adjusted under 35 U.S.C. 154(b) by 1130 days.

(21) Appl. No.: 17/764,376

(22) PCT Filed: Nov. 10, 2021

(86) PCT No.: PCT/CN2021/129880
§ 371 (c)(1),
(2) Date: Mar. 28, 2022

(87) PCT Pub. No.: WO2022/148124
PCT Pub. Date: Jul. 14, 2022

(65) Prior Publication Data

US 2023/0343511 A1 Oct. 26, 2023

(30) Foreign Application Priority Data

Jan. 11, 2021 (CN) ......................... 202110030542.3

(51) Int. Cl.
*H01F 27/32* (2006.01)
*H01F 27/28* (2006.01)
(Continued)

(52) U.S. Cl.
CPC ....... *H01F 27/327* (2013.01); *H01F 27/2866* (2013.01); *H01F 27/306* (2013.01);
(Continued)

(58) Field of Classification Search
CPC .. H01F 27/327; H01F 27/2866; H01F 27/306; H01F 2027/328
(Continued)

(56) References Cited

U.S. PATENT DOCUMENTS 6,147,580 A * 11/2000 Rettew .................. H01F 27/327 336/60
8,659,382 B2 * 2/2014 Xu ...................... H01F 17/0013 336/5

(Continued)

FOREIGN PATENT DOCUMENTS

CN 1516206 A * 7/2004
CN 1165924 9/2004

(Continued)

OTHER PUBLICATIONS

The First office action of Chinese family patent No. 202110030542.3, issued on Dec. 28, 2024.

(Continued)

*Primary Examiner* — Shawki S Ismail
*Assistant Examiner* — Joselito S. Baisa
(74) *Attorney, Agent, or Firm* — Ware, Fressola, Maguire & Barber LLP

(57) ABSTRACT

A casting dry-type transformer and a manufacturing method thereof are disclosed. The transformer includes a coil, an iron core, a clamp and a leading wire. The leading wire is led
(Continued)

out from the coil, the coil is arranged on the iron core, the coil and the iron core are fixed together by the clamp at two sides, the coil is provided with a casting die, the casting die is provided with evenly distributed channels, a transformer body is placed into a casting tank to cast a transformer, and a casting material is easy to penetrate into the coil through a reserved channel.

7 Claims, 7 Drawing Sheets

(51) Int. Cl.
*H01F 27/30* (2006.01)
*H01F 41/00* (2006.01)
*H01F 41/12* (2006.01)

(52) U.S. Cl.
CPC ......... *H01F 41/005* (2013.01); *H01F 41/127* (2013.01); *H01F 2027/328* (2013.01)

(58) Field of Classification Search
USPC ............................................. 336/180, 90, 67
See application file for complete search history.

(56) References Cited

U.S. PATENT DOCUMENTS

| | | | | |
|---|---|---|---|---|
| 2002/0130749 | A1* | 9/2002 | Hay ...................... | H01F 27/306 336/190 |
| 2007/0279177 | A1 | 12/2007 | Sarver et al. | |
| 2011/0063062 | A1* | 3/2011 | Lim ...................... | H01F 41/127 29/605 |
| 2014/0002229 | A1 | 1/2014 | Xu et al. | |
| 2014/0118946 | A1* | 5/2014 | Tong ..................... | H01F 27/322 361/704 |
| 2014/0132381 | A1* | 5/2014 | Weber ................... | H01F 27/322 336/60 |

FOREIGN PATENT DOCUMENTS

| | | | | |
|---|---|---|---|---|
| CN | 202025642 | U | | 11/2011 |
| CN | 102306541 | A | | 1/2012 |
| CN | 103354156 | | | 10/2013 |
| CN | 204991403 | U | | 1/2016 |
| CN | 206412192 | U | * | 8/2017 |
| CN | 107221410 | | | 9/2017 |
| CN | 108242325 | | | 7/2018 |
| CN | 108962585 | | | 12/2018 |
| CN | 210429510 | U | * | 4/2020 |
| CN | 211045241 | U | * | 7/2020 |
| CN | 112735743 | | | 4/2021 |
| CN | 213211873 | U | * | 5/2021 |
| CN | 119673624 | A | * | 3/2025 |
| DE | 112017006719 | T5 | | 9/2019 |
| JP | S52138618 | A | | 11/1977 |
| JP | S55160415 | A | | 12/1980 |
| JP | S5658215 | A | | 5/1981 |
| JP | H02110533 | A | | 4/1990 |
| WO | 2005027155 | A1 | | 3/2005 |

OTHER PUBLICATIONS

The First office action of German family patent No. 112021000119.1, issued on Aug. 30, 2024.
The First office action of Indian family patent No. 202227017040, issued on Jun. 7, 2024.
The First office action of Japanese family patent No. 2022-518394, issued on May 16, 2023.
The First search report of Chinese family patent No. 202110030542.3, issued on Dec. 27, 2024.
Written Opinion of the International Searching Authority for PCT/CN2021/129880, mailed on Dec. 22, 2021.

* cited by examiner

CASTING DRY-TYPE TRANSFORMER AND MANUFACTURING METHOD THEREOF

CROSS-REFERENCE TO RELATED APPLICATIONS

This application is a national stage filing under 35 U.S.C. § 371 of international application number PCT/CN2021/129880, filed Nov. 10, 2021, which claims priority to Chinese patent application No. 2021100305423 filed Jan. 11, 2021. The contents of these applications are incorporated herein by reference in their entirety.

TECHNICAL FIELD

The disclosure relates to a stereoscopic wound iron core transformer, and more particularly, to a casting dry-type transformer and a manufacturing method thereof.

BACKGROUND

With the development of transformer industry, the competition is becoming higher, and all manufacturers are paying more and more attention to improvement of the production efficiency of products to reduce the production cost. Meanwhile, the manufacturers are constantly improving products and improving performances of transformer products in all aspects to improve the market competitiveness of products.

Casting dry-type transformer, as a traditional dry-type transformer, has been widely used in various indoor buildings due to the advantages of easy maintenance and superior electrical performance, but many problems are also exposed. Firstly, for the traditional dry-type transformer, a coil is casted into an entity with casting material, and the casting material is usually combustible, which may catch fire in case of failure and produce toxic gas. Secondly, since the casting material is relatively thick, the casting material is easy to crack in the case of use in cold areas and sudden change of temperature, which leads to failure. When the casting dry-type transformer needs to be maintained, since each phase coil is an entity encapsulated by the casting material, the casting dry-type transformer can only be maintained by dismantling the whole coil and then rewinding the coil, so that it is very difficult to maintain the casting dry-type transformer.

Production of the traditional casting dry-type transformer is also complicated, with a main difficulty in casting. According to the traditional process, a casting die needs to be mounted first before casting, and then the casting material is casted into the die for molding. However, the casting die is often complicated in structure and time-consuming in mounting, and casting channels of the die are narrow; so that leakage of the casting material and incomplete casting of some parts often occur during casting, and the coil needs to be repaired. Moreover, after casting, the die should be dismantled and the transformer should be assembled, which is easy to damage the casted coil. Rework often occurs, so that the production efficiency is low.

SUMMARY

The present application aims to solve at least one of the technical problems in related art to some extent. Therefore, the present application provides a casting dry-type transformer and a manufacturing method thereof. The novel casting dry-type transformer reduces combustible substances, solves problems of cracking of a casting material and difficult maintenance of a transformer, creatively provides a novel process implementation method, solves problems of time-consuming mounting of a casting die, airtightness of the casting die and permeability of the casting material by using an insulating casting die and a special casting process, and greatly improves a production efficiency of the transformer. Moreover, the patent transformer has a lower production cost, a lower weight, a larger overload capacity and is easier to maintain.

The technical solutions used in the disclosure to solve the problems are as follows.

In an aspect, an embodiment of the disclosure provides a casting dry-type transformer, including a coil, an iron core, a clamp and a leading wire, wherein the leading wire is led out from the coil, the coil is arranged on the iron core, the coil and the iron core are fixed together by the clamp at two sides, the coil is provided with a casting die for casting the coil, the casting die is internally provided with evenly distributed channels, and the coil is casted with a casting material which is an insulating material, wherein the casting die is made of the insulating material, and is combined with the coil into an integrated structure without disassembly after casting.

The casting dry-type transformer above at least have the following beneficial effects. The casting die of the disclosure is provided with evenly distributed channels, the coil is casted with the insulating material, and excess casting material can be discharged from the casting die, which reduces a casting thickness, improves moisture-proof and corrosion-proof performances of the coil, and saves materials and reduces costs at the same time, so that a weight of a combustible of the transformer is much reduced compared with that of a traditional casting transformer, and a safety and a reliability of the transformer are improved. Meanwhile, since the casting material is relatively thin, the casting channels are also heat dissipation channels of the coil, with a large heat dissipation area, so that a heat dissipation capacity and an overload capacity of the transformer are also improved, the insulating material would not crack due to sudden temperature change, a curing time of the insulating material is shortened, and a production efficiency is improved. In addition, the casting die is detachable, so that when there is a problem with the coil to be treated, it is only necessary to open the casting die, bind and repair the coil, and then assemble the casting die to cast again, which makes the transformer easier to maintain.

Further, the iron core has a stereoscopic wound iron core structure, the iron core includes three individual frames, every two individual frames are spliced together at an included angle of 60 degrees, and one core post is formed at a spliced part of every two individual frames.

Further, each individual frame is formed by winding a plurality of silicon steel sheets or amorphous alloy strips.

Further, the coil further includes an inner coil and an outer coil, the inner coil is wound between the core post and the outer coil, and the leading wire includes an inner coil leading wire and an outer coil leading wire.

Further, the casting die includes an inner casting die and an outer casting die, the inner casting die is arranged at an inner side of the outer coil, and the outer casting die is arranged at an outer side of the outer coil.

Further, the inner casting die and the outer casting die are both made of an insulating material, the inner casting die has a cylinder structure, and the outer casting die has a combined structure of a cylinder and an end ring.

Further, the outer coil includes a comb-shaped strut and the leading wire, the comb-shaped strut is arranged on the inner casting die, and the leading wire is wound on the comb-shaped strut.

Further, the comb-shaped strut includes a plurality of strips arranged at even intervals, and the leading wire is wound between the strips.

Further, the leading wire includes a first leading wire and a second leading wire, the first leading wire is led out from the inner coil, and the second leading wire is led out from the outer coil.

In another aspect, a method for manufacturing a casting dry-type transformer is provided, wherein the casting dry-type transformer includes a coil, an iron core, a clamp and a leading wire, the leading wire is led out from the coil, the coil is arranged on the iron core, the coil and the iron core are fixed together by the clamps at two sides, the coil is provided with a casting die for casting the coil, the casting die is internally provided with evenly distributed channels, and the coil is casted with a casting material, wherein the casting die is made of an insulating material, and is combined with the coil into an integrated structure without disassembly after casting, the iron core includes three individual frames, one core post is formed at a spliced part of every two individual frames, the coil further includes an inner coil and an outer coil, the inner coil is wound between the core post and the outer coil, the casting die includes an inner casting die and an outer casting die, the inner casting die is arranged at an inner side of the outer coil, the outer casting die is arranged at an outer side of the outer coil, the outer coil includes a comb-shaped strut and the leading wire, the comb-shaped strut is arranged on the inner casting die, the comb-shaped strut includes a plurality of strips at even intervals, and the leading wire is wound between the strips, and the method includes the following steps of:

(1) winding the coil and assembling a transformer body, and drying the transformer body;
(2) placing the transformer body into a casting tank, vacuumizing the transformer body, and then injecting a degassed casting material into the casting tank, so that a liquid level of the casting material is higher than the coil, and the casting material is injected from channels of the casting die and filled in the whole coil;
(3) releasing a vacuum state of the casting tank and pressurizing the casting tank, so that the casting material is injected into gaps inside the coil;
(4) after casting, discharging excess casting material in the casting die out from the channels; and
(5) placing the transformer body into a drying furnace to cure the casting material.

Further, the winding the coil and assembling a transformer body, and drying the transformer body, includes:

(1) winding the inner coil on the core post of the iron core;
(2) winding the inner casting die at the inner side of the outer coil, and fixing the inner casting die;
(3) fixing the comb-shaped strut on a surface of the inner casting die, and after fixing, winding the leading wire of the coil between the strips; and
(4) winding the outer casting die at the outer side of the outer coil, and reserving a channel between the inner casting die and the outer casting die to facilitate injection or discharge of the casting material.

In another embodiment, the outer casting die may also be mounted at the outer side of the outer coil after curing the casting material.

The method for manufacturing a casting dry-type transformer above at least have the following beneficial effects: due to different casting methods in the patent, an airtightness of the casting die does not need to be considered, the die is simple and easy to mount, and after casting, the casting die may be directly used as an insulating member of the transformer without disassembly, thus improving a production efficiency of products. Excess casting material is discharged from the casting die, which reduces a casting thickness, improves moisture-proof and corrosion-proof performances of the coil, and saves materials and reduces costs at the same time, so that a weight of a combustible of the transformer is much reduced compared with that of a traditional casting transformer, and a safety and a reliability of the transformer are improved. Meanwhile, since the casting material is relatively thin, the casting channels are also heat dissipation channels of the coil, with a large heat dissipation area, so that a heat dissipation capacity and an overload capacity of the transformer are also improved, the insulating material would not crack due to sudden temperature change, a curing time of the insulating material is shortened, and a production efficiency is improved. In addition, during casting, the degassed casting material is injected into the casting tank, and then the casting material is injected into the coil through the reserved channel of the casting die by using vacuum and pressure, so that the casting material easily penetrates into the coil, and a problem of incomplete casting of the coil is solved. Moreover, the outer casting die is detachable, so that when there is a problem with the coil to be treated, it is only necessary to open the casting die, bind and repair the coil, and then assemble the casting die to cast again, so that the transformer is easier to maintain.

The additional aspects and advantages of the disclosure will be given in part in the following description, and will become apparent in part from the following description, or will be learned through the practice of the disclosure.

BRIEF DESCRIPTION OF THE DRAWINGS

The preferred embodiments of the disclosure are provided hereinafter with reference to the accompanying drawings, so as to describe the implementations of the disclosure in detail.

DETAILED DESCRIPTION

Figure 1:
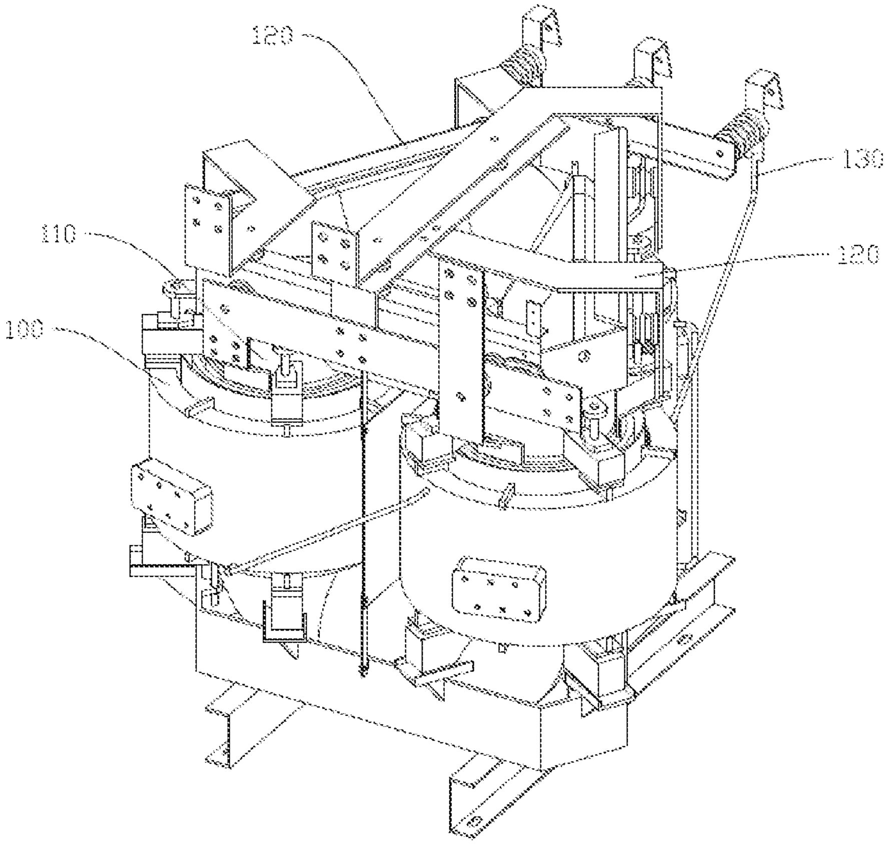
FIG. 1 is a schematic diagram of a casting dry-type transformer according to an embodiment of the disclosure.

This part will describe the specific embodiments of the disclosure in detail, and the preferred embodiments of the disclosure are shown in the accompanying drawings. The accompanying drawings are used to supplement the description of the text in the description with the graphs, so that one can intuitively and vividly understand each technical feature and the overall technical solution of the disclosure, but the accompanying drawings cannot be understood as limiting the scope of protection of the disclosure.

In the description of the disclosure, it should be understood that the positional descriptions referred to, for example, the directional or positional relationships indicated by up, down, front, rear, left, right, etc., are based on the directional or positional relationships shown in the drawings, and are only for convenience and simplification of description of the disclosure, but not for indicating or implying that the referred device or element must have a specific direction, be constructed and operated in a specific direction, and thus should not be construed as limiting the disclosure.

In the description of the disclosure, unless otherwise expressly defined, the terms such as “disposed”, “mounted”, and “connected” should be understood in a broad sense. For persons of ordinary skill in the art, specific meanings of the terms in the disclosure may be appropriately determined with reference to the specific content in the technical solution.

The embodiments of the disclosure are described hereinafter with reference to the accompanying drawings.

Figure 4:
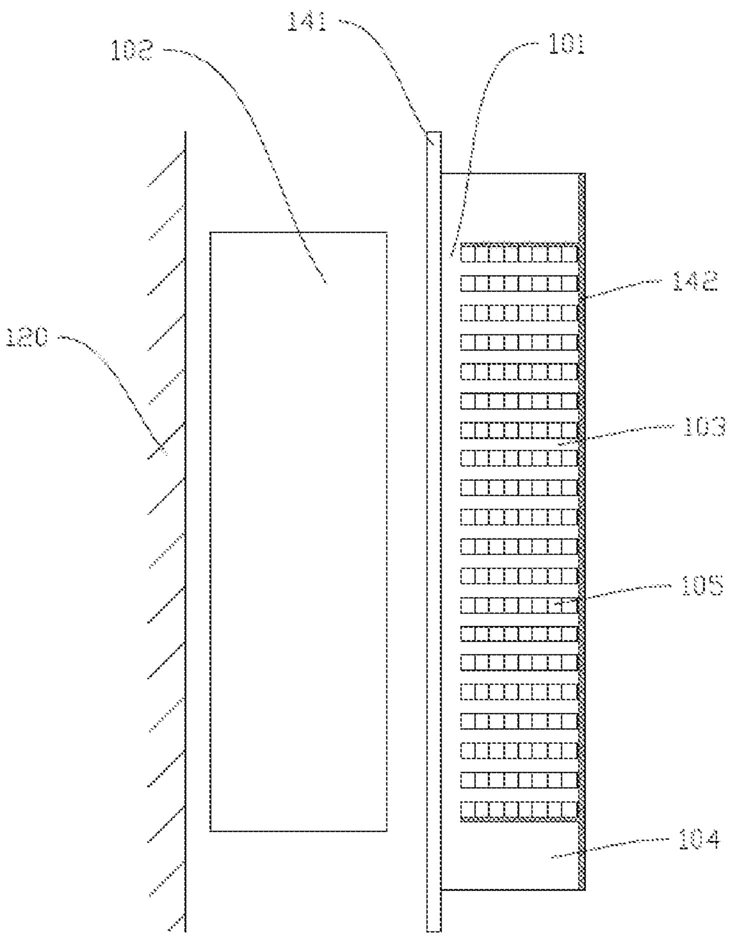
FIG. 4 is a cross-section view of the coil according to the embodiment of the disclosure.

With reference to FIG. 1 and FIG. 4, an embodiment of the disclosure provides a casting dry-type transformer, including: a coil 100, an iron core 110, a clamp 120 and a leading wire 130. The leading wire 130 is led out from the coil 100, the coil 100 is arranged on the iron core 110, and the coil 100 is provided with a casting die for casting the coil 100. The casting die is internally provided with evenly distributed channels 101, and the coil 100 is casted with a casting material which is an insulating material. The casting die is made of an insulating material, and is combined with the coil 100 into an integrated structure without disassembly after casting.

The casting dry-type transformer above at least have the following beneficial effects. The casting die of the disclosure is provided with evenly distributed channels 101, the coil 100 is casted with the insulating material, and excess casting material can be discharged from the casting die, which reduces a casting thickness, improves moisture-proof and corrosion-proof performances of the coil 100, and saves materials and reduces costs at the same time, so that a weight of a combustible of the transformer is much reduced compared with that of a traditional casting transformer, and a safety and a reliability of the transformer are improved. Meanwhile, since the casting material is relatively thin, the casting channels 101 are also heat dissipation channels of the coil 100, with a large heat dissipation area, so that a heat dissipation capacity and an overload capacity of the transformer are also improved, the insulating material would not crack due to sudden temperature change, a curing time of the insulating material is shortened, and a production efficiency is improved. In addition, the casting die is detachable, so that when there is a problem with the coil 100 to be treated, it is only necessary to open the casting die, bind and repair the coil 100, and then assemble the casting die to cast again, which makes the transformer easier to maintain.

Figure 2:
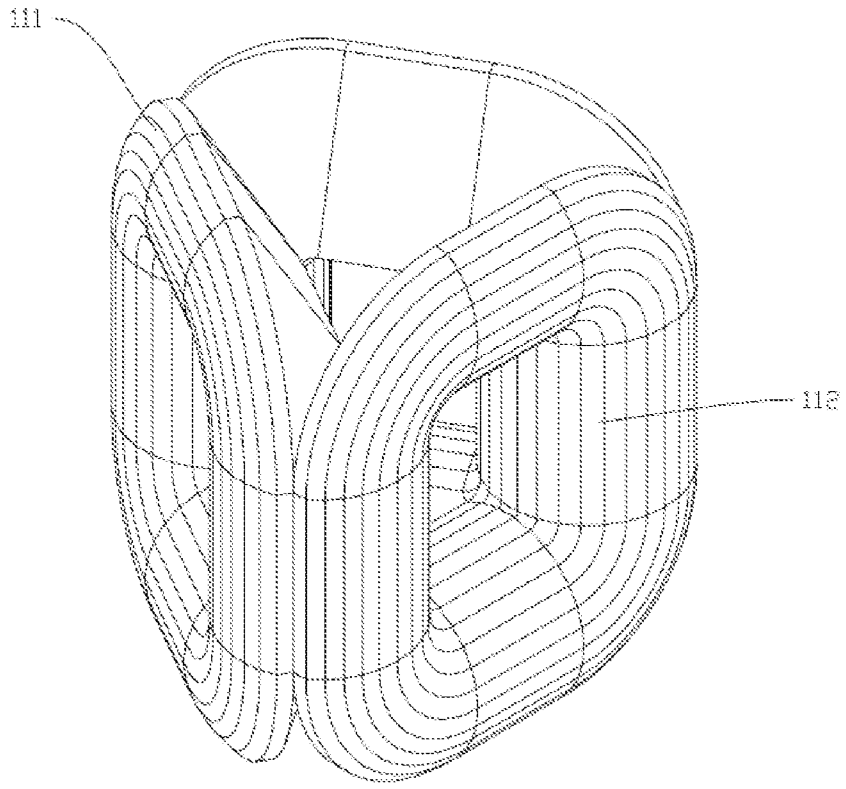
FIG. 2 is a schematic diagram of an iron core according to an embodiment of the disclosure.

With reference to FIG. 2, in the embodiment of the disclosure, the iron core 110 has a stereoscopic wound iron core structure, the iron core 110 includes three individual frames 111, every two individual frames 111 are spliced together at an included angle of 60 degrees, and one core post is formed at the spliced part of every two individual frames 111. Each individual frame 111 is formed by winding a plurality of silicon steel sheets or amorphous alloy strips. A stereoscopic wound iron core transformer is an energy-saving electric power transformer, which creatively reforms a laminated magnetic circuit structure and a three-phase layout of a traditional electric power transformer, and makes a performance of products more optimized. For example, a three-phase magnetic circuit is completely symmetrical, an electric power saving effect of an oil-immersed stereoscopic wound iron core transformer is remarkable, noise is greatly reduced, a heat dissipation capacity and an overload capacity are larger, and a compact structure and a small volume are achieved.

Figure 3:
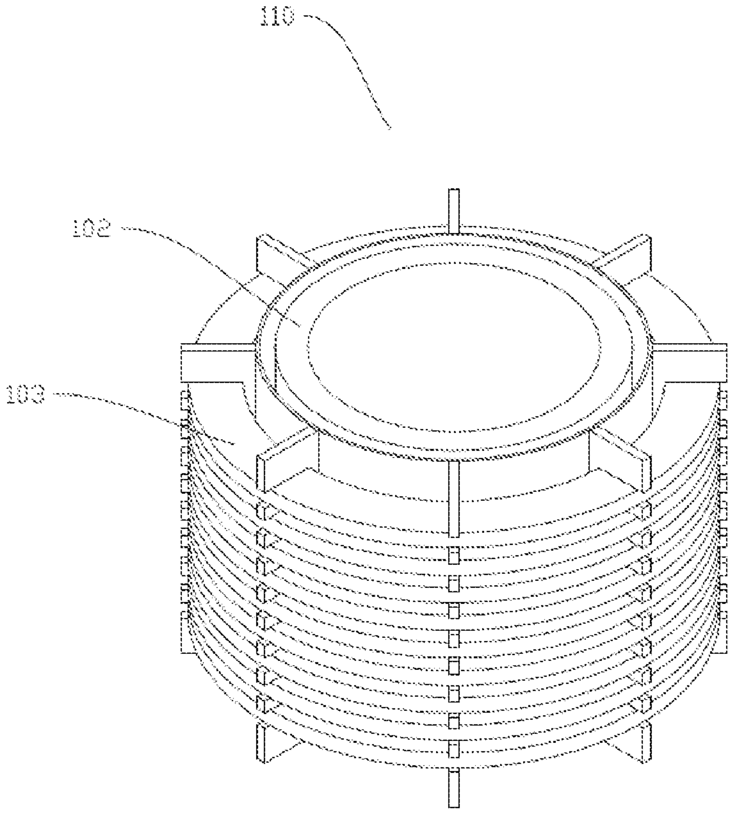
FIG. 3 is a schematic diagram of a coil according to an embodiment of the disclosure.

In the embodiment of the disclosure, with reference to FIG. 3, the coil 100 further includes an inner coil 102 and an outer coil 103, and the inner coil 102 is wound between the core post 112 and the outer coil 103.

In the embodiment of the disclosure, with reference to FIG. 4, the casting die includes an inner casting die 141 and an outer casting die 142, the inner casting die 141 is arranged at an inner side of the outer coil 103, the outer casting die 142 is arranged at an outer side of the outer coil 103, and the casting material is injected into the casting die, so that the casting material penetrates into the coil 100.

In the embodiment of the disclosure, the inner casting die 141 and the outer casting die 142 are both made of an insulating material, the inner casting die 141 has a cylinder structure, and the outer casting die 142 has a combined structure of a cylinder and an end ring. After casting, the casting die may be directly used as an insulating member of the transformer, which is free from dismantling and improves a production efficiency.

Figure 5:
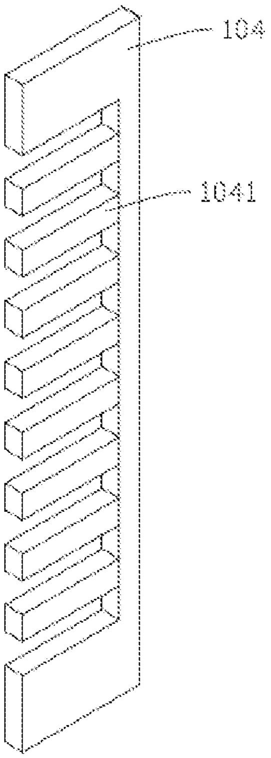
FIG. 5 is a schematic diagram of a comb-shaped strut according to an embodiment of the disclosure.

In the embodiment of the disclosure, with reference to FIG. 4 and FIG. 5, the outer coil 103 includes a comb-shaped strut 104 and a leading wire 105, the comb-shaped strut 104 is arranged on the inner casting die 141, and the leading wire 105 is wound on the comb-shaped strut 104.

In the embodiment of the disclosure, with reference to FIG. 5, the comb-shaped strut 104 includes a plurality of strips 1041 arranged at even intervals, and the leading wire 105 is wound between the strips 1041, so that a gap is formed between pies of the coil 100 to improve a heat dissipation performance of the coil 100 and make the casting material easy to be injected into and discharged from the coil 100.

In the embodiment of the disclosure, the leading wire 130 includes an inner coil leading wire and an outer coil leading wire. The inner coil leading wire is led out from the inner coil 102 and the outer coil leading wire is led out from the outer coil 103.

Figure 6:
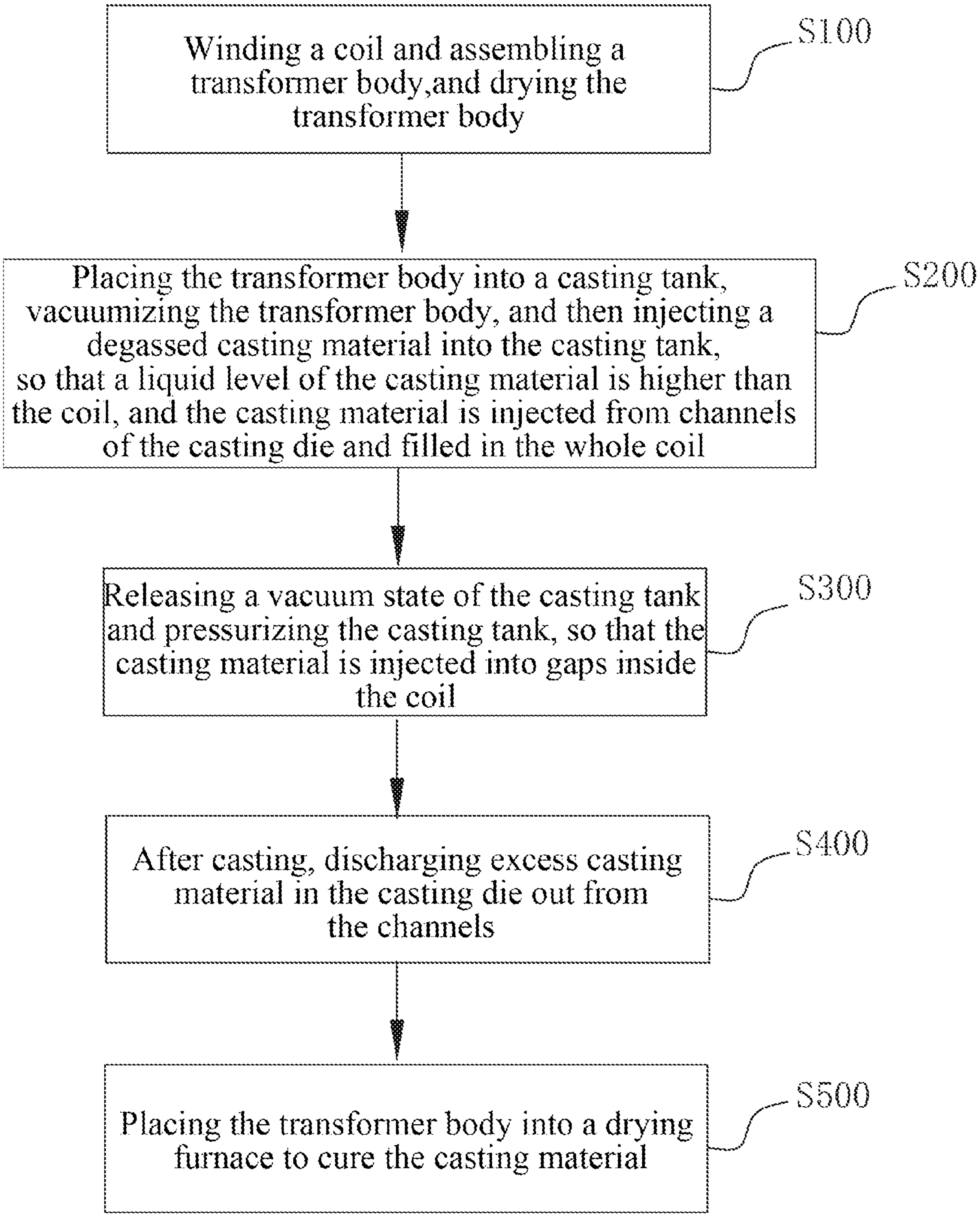
FIG. 6 is a flow chart of a method for manufacturing a casting dry-type transformer according to an embodiment of the disclosure.

With reference to FIG. 6, a method for manufacturing a casting dry-type transformer is provided. The casting dry-type transformer includes a coil 100, an iron core 110, a clamp 120 and a leading wire 130. The leading wire 130 is led out from the coil 100, the coil 100 is arranged on the iron core 110, the coil 100 is provided with a casting die for casting the coil 100, the casting die is internally provided with evenly distributed channels 101, and the coil 100 is casted with a casting material which is an insulating material. The casting die is made of an insulating material, and is combined with the coil 100 into an integrated structure without disassembly after casting. The iron core 110 includes three individual frames 111, every two individual frames 111 are spliced together at an included angle of 60 degrees, and one core post 112 is formed at the spliced part of every two individual frames. The coil 100 further includes an inner coil 102 and an outer coil 103, and the inner coil 102 is wound between the core post 112 and the outer coil 102. The casting die includes an inner casting die 141 and an outer casting die 142, the inner casting die 141 is arranged at an inner side of the outer coil 102, and the outer casting die 142 is arranged at an outer side of the outer coil 103. The outer coil 103 includes a comb-shaped strut 104 and a leading wire 105, and the comb-shaped strut 104 is arranged on the inner casting die 141. The leading wire 105 is wound on the comb-shaped strut 104, the comb-shaped strut 104 includes a plurality of strips 1041 arranged at even intervals, and the leading wire 105 is wound in a gap between the strips 1041. The method includes the following steps of:

S100: winding the coil and assembling a transformer body, and drying the transformer body;

S200: placing the transformer body into a casting tank, vacuumizing the transformer body, and then injecting a degassed casting material into the casting tank, so that a liquid level of the casting material is higher than the coil, and the casting material is injected from channels of the casting die and filled in the whole coil;

S300: releasing a vacuum state of the casting tank and pressurizing the casting tank, so that the casting material is injected into gaps inside the coil;

S400: after casting, discharging excess casting material in the casting die out from the channels; and S500: placing the transformer body into a drying furnace to cure the casting material.

Figure 7:
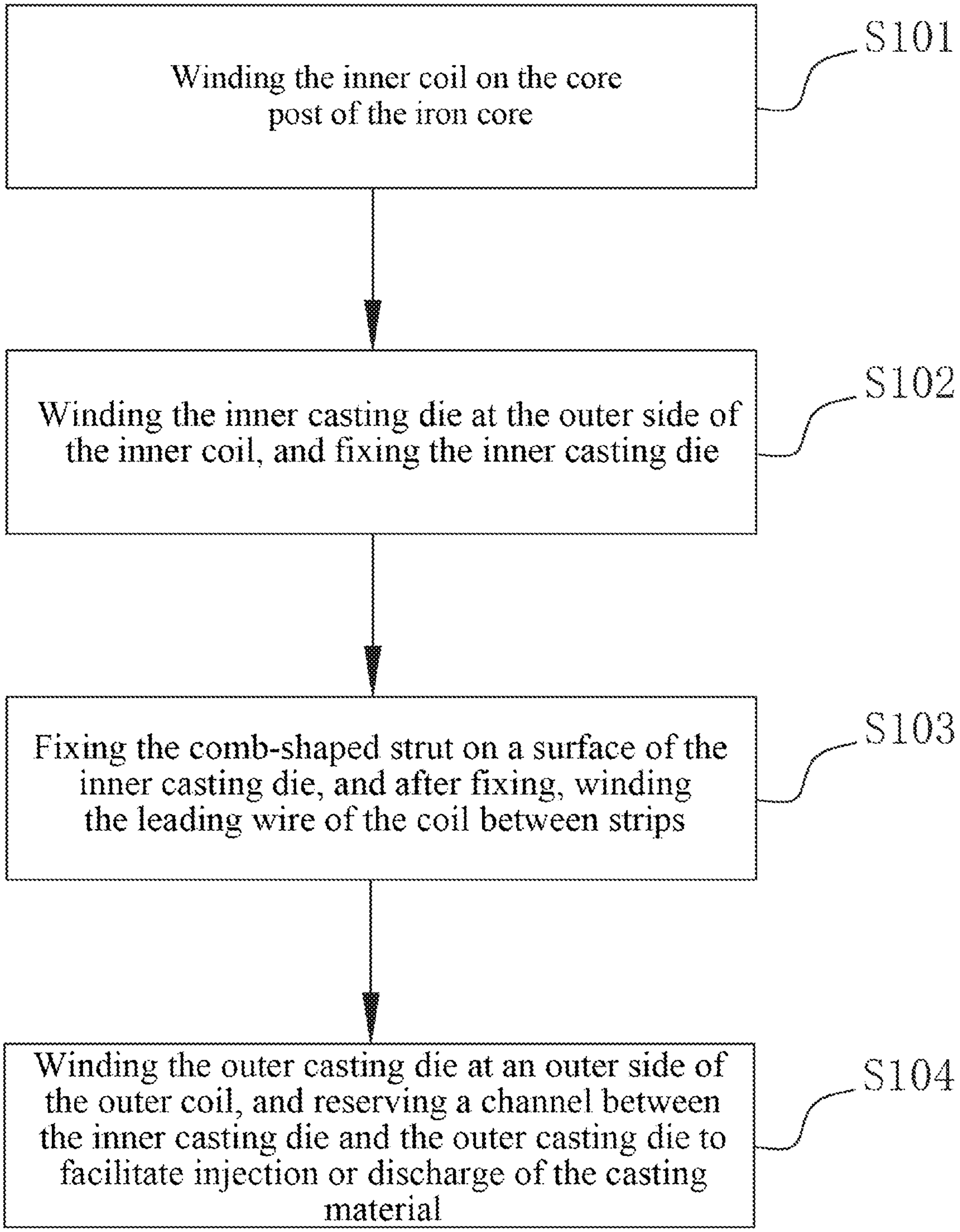
FIG. 7 is a flow chart of a method for manufacturing a casting dry-type transformer according to the embodiment of the disclosure.

In the embodiment, with reference to FIG. 7, the step of winding the coil and assembling a transformer body, and drying the transformer body includes:

S101: winding the inner coil on the core post of the iron core;

S102: winding the inner casting die at the inner side of the outer coil, and fixing the inner casting die;

S103: fixing the comb-shaped strut on a surface of the inner casting die, and after fixing, winding the leading wire of the coil between the strips; and S104: winding the outer casting die at the outer side of the outer coil, and reserving a channel between the inner casting die and the outer casting die to facilitate injection or discharge of the casting material.

In another embodiment, the outer casting die may also be mounted at the outer side of the outer coil after curing the casting material.

The method for manufacturing a casting dry-type transformer above at least have the following beneficial effects. Due to different casting methods of the disclosure, airtightness of the casting die does not need to be considered, the die is simple and easy to mount, and after casting, the casting die may be directly used as an insulating member of the transformer without disassembly, thus improving a production efficiency of products. Excess casting material is discharged from the casting die, which reduces a casting thickness, improves moisture-proof and corrosion-proof performances of the coil 100, and saves materials and reduces costs at the same time, so that a weight of a combustible of the transformer is much reduced compared with that of a traditional casting transformer, and a safety and a reliability of the transformer are improved. Meanwhile, since the casting material is relatively thin, the casting channels 101 are also heat dissipation channels of the coil 100, with a large heat dissipation area, so that a heat dissipation capacity and an overload capacity of the transformer are also improved, the insulating material would not crack due to sudden temperature change, a curing time of the insulating material is shortened, and a production efficiency is improved. In addition, during casting, the degassed casting material is injected into the casting tank, and the casting material easily penetrates into the coil 100 through the reserved channel, which solves a problem of incomplete casting of the coil 100. Moreover, the outer casting die is detachable, so that when there is a problem with the coil to be treated, it is only necessary to open the casting die, bind and repair the coil, and then assemble the casting die to cast again, so that the transformer is easier to maintain.

The foregoing describes the preferred embodiments and fundamental principles of the disclosure in detail, but the disclosure is not limited to the above implementations. Those of ordinary skills in the art may further make various equivalent modifications or substitutions without violating the gist of the disclosure, and these equivalent modifications or substitutions are included in the scope of the disclosure.

The invention claimed is:

1. A casting dry-type transformer, comprising a coil, an iron core, a clamp and a leading wire, wherein the leading wire is led out from the coil, the coil is arranged on the iron core, the coil and the iron core are fixed together by the clamp at two sides, the coil is provided with a casting die for casting the coil, the casting die is internally provided with evenly distributed channels, and the coil is casted with a casting material, wherein the casting die is made of an insulating material, and is combined with the coil into an integrated structure without disassembly after casting;

the iron core comprises three individual frames, and one core post is formed at a spliced part of every two individual frames;

the coil further comprises an inner coil and an outer coil, the inner coil is wound between the core post and the outer coil, the casting die comprises an inner casting die and an outer casting die, the inner casting die is arranged at an inner side of the outer coil, the outer casting die is arranged at an outer side of the outer coil, and the leading wire comprises an inner coil leading wire and an outer coil leading wire;

the inner casting die and the outer casting die are both made of an insulating material; and the channels are located between the inner casting die and the outer casting die, and the channels are configured for injection or discharge of a casting material.

2. The casting dry-type transformer of claim 1, wherein the iron core has a stereoscopic wound iron core structure, every two individual frames are spliced together at an included angle of 60 degrees.

3. The casting dry-type transformer of claim 2, wherein each individual frame is formed by winding a plurality of silicon steel sheets or amorphous alloy strips.

4. The casting dry-type transformer of claim 1, wherein the inner casting die has a cylinder structure, and the outer casting die has a combined structure of a cylinder and an end ring.

5. The casting dry-type transformer of claim 1, wherein the outer coil comprises a comb-shaped strut and the leading wire, the comb-shaped strut is arranged on the inner casting die, and the leading wire is wound on the comb-shaped strut.

6. The casting dry-type transformer of claim 5, wherein the comb-shaped strut comprises a plurality of strips arranged at even intervals, and the leading wire is wound between the strips.

7. The casting dry-type transformer of claim 1, wherein the outer casting die is detachable.

* * * * *